UNITED STATES PATENT OFFICE.

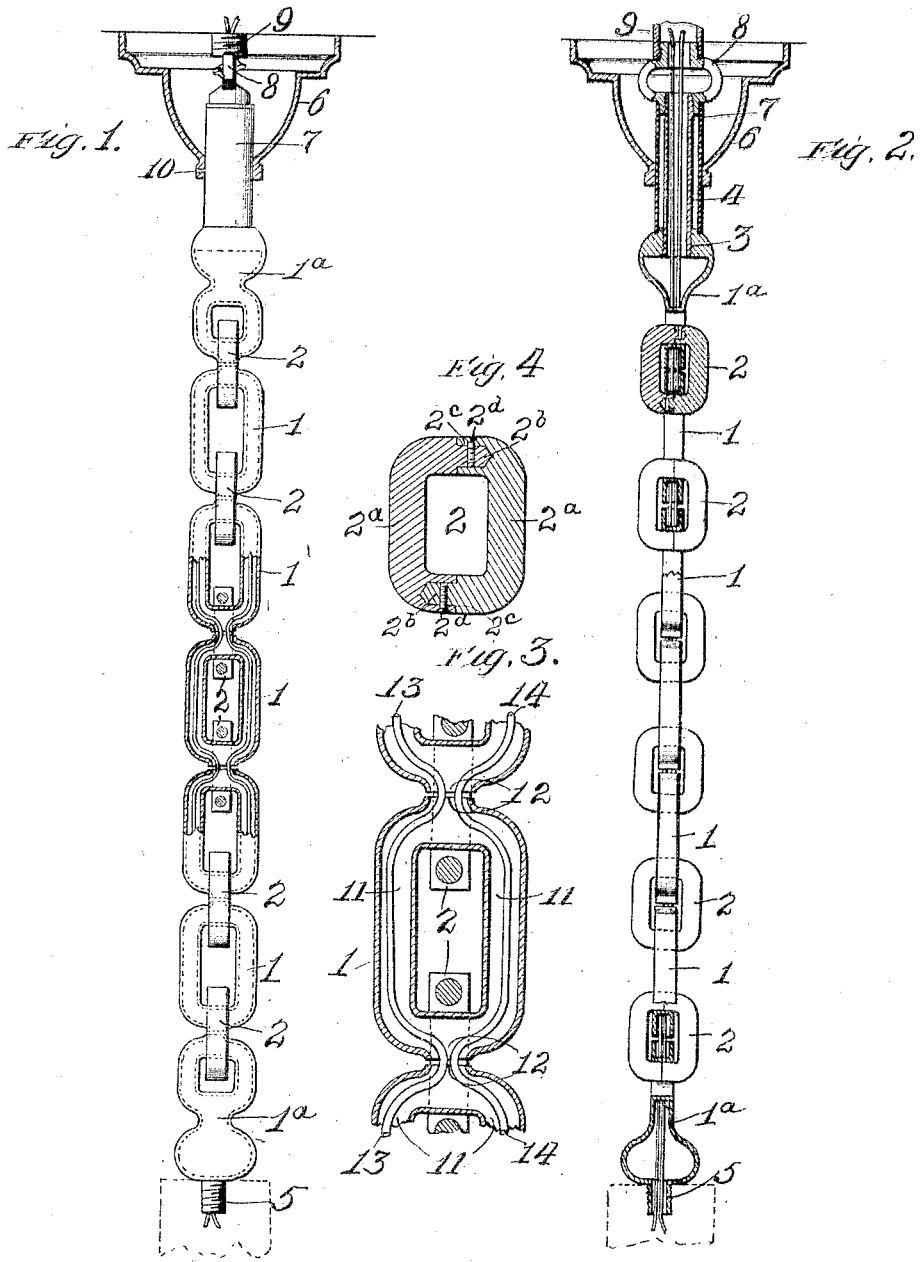

WILLIAM H. BLAKE, OF BOSTON, MASSACHUSETTS, ASSIGNOR TO FLORA S. ALDEN, OF BOSTON, MASSACHUSETTS.

CONCEALED-WIRE-SUPPORTING CHAIN.

1,098,779.  Specification of Letters Patent.  Patented June 2, 1914.

Application filed October 18, 1912. Serial No. 726,582.

*To all whom it may concern:*

Be it known that I, WILLIAM H. BLAKE, a citizen of the United States, residing at Boston, in the county of Suffolk and State of Massachusetts, have invented certain new and useful Improvements in Concealed-Wire-Supporting Chains, of which the following is a specification.

This invention relates to chains for supporting electric fixtures provided with a conductor or conductors concealed within them.

The object of the invention is to provide an improved construction of chain serving the purposes stated and particularly one in which it will not be necessary to dissect the links for the purpose of introducing the wires.

Further objects relate to the preservation of aesthetic characteristics without detracting from the practical efficiency of the device as a support having the essential characteristics of a flexible linked chain.

The principal objects of the invention are realized mainly by having the wires pass through only the alternate links, the intermediate links serving only as mechanical connecting means, and the wire-receiving links having open ends which are brought into substantial communication, though sufficiently separated to permit range of relative movement sufficient to lend flexibility to the chain as a whole.

The invention will be fully understood upon reference to the accompanying drawing, in which—

Figures 1 and 2 are two views at right angles to each other, each showing the subject matter of the present invention partly in section; Fig. 3 is an enlarged sectional detail view in the same plane as Fig. 1, while Fig. 4 is an enlarged sectional view in the same plane as Fig. 2.

The chain comprises two kinds of links, namely, conduit links 1 and connecting links 2; the end conduit links being preferably adapted at one end for attachment to the outlet or other support and to the electric fixture, for which purpose said end links 1ª are provided with screw threads such as 3 to receive the nipple 4, as shown at top, or with a screw thread 5 in the form of a nipple to receive the electric fixture, as suggested at the bottom in Figs. 1 and 2.

6 represents a canopy at top mounted to have a limited slip upon the sleeve 7 which surrounds the nipple 4 so as to give access to a coupling 8, which is adapted for connection with the house pipe 9. The coupling 8 has a bore at top and bottom, but is open on the sides in order to permit uniting the wires with the house wiring. The sleeve 7 is secured between the coupling 8 and the upper link 1ª, and the canopy 6 is fixed upon said sleeve by a screw 10.

The links 1 are conveniently made as integral castings cored to provide conduits 11 on their opposite sides communicating with end openings 12, and these links are held together by the intermediate connecting links 2 in such manner that the end openings 12 are made to substantially communicate, though sufficiently spaced apart to avoid undue restriction in the flexibility of the chain. Thus not only can a wire or wires, such for instance as indicated at 13 and 14, be readily passed through a link 1, but said links can be successively threaded upon the wire or wires until sufficient links have been accumulated to make the desired length of chain, after which the intermediate or mechanically connecting links 2 are assembled with the wired links.

The links 2 are the only links that need be dissected for assembling the chain, and these comprise parts separable and adapted to be united in any manner that will enable them to be engaged in the middle openings of the wired links. They are preferably divided into two longitudinal members 2ª, abutting in the longitudinal plane of division and provided at each end with a dowel connection consisting of a dowel 2ᵇ on one part entering a socket 2ᶜ on the other part, with a screw 2ᵈ passing through the wall of the socket and into the dowel. Each member 2ª may carry a socket on one end and a dowel on the other. The links 2 are of such internal dimension as to support the wired links in the proper relations to each other and transmit the load from one wired link to the next without imposing any strain upon the contained wires. The end openings in the conduit links are of such dimensions as to lie between the planes of the outer faces of the connecting links and to be thereby concealed in one view of the chain.

It will be observed that the end openings 12 are flanged so that concealing means are provided between the opposed ends of the conduit links for the portions of the wires lying within the planes of the connecting links. These concealing means, in the embodiment of the invention selected for illustration, are carried by the opposed ends of the conduit links.

Claims:

1. A wire concealing chain comprising a series of conduit links and a series of intermediate connecting links alternating and interengaging with the conduit links so as to jointly support a load; said conduit links having external end openings through which a wire may pass in the same vertical plane from one conduit link to the next conduit link without entering said connecting links.

2. A wire concealing chain comprising a series of conduit links and a series of intermediate connecting links alternated in position with the conduit links and coöperating therewith to support a load; each of said conduit links having external end openings facing in opposite direction in the longitudinal axis of the chain and through which a wire may pass in the same vertical plane from one conduit link to the next conduit link without entering said connecting links.

3. A wire concealing chain comprising a series of conduit links and a series of intermediate connecting links alternated in position with the conduit links and coöperating therewith to support a load; each of said conduit links having external end openings facing in opposite direction in the longitudinal axis of the chain and through which a wire may pass in the same vertical plane from one conduit link to the next conduit link without entering said connecting links; covering means being provided substantially concealing the portions of the wire between the conduit links and within the connecting links.

4. A wire concealing chain comprising a series of conduit links and a series of intermediate connecting links alternated in position with the conduit links and coöperating therewith to support a load; said conduit links having neck-shaped extensions at their extreme ends with external end openings through which a wire may pass from one conduit link to the next conduit link; the neck-shaped extensions substantially concealing the portions of the wires lying intermediate of the conduit links.

5. A wire concealing chain comprising a series of alternating compact and hollow links, said hollow links having conduits through which a wire is made to pass in the same vertical plane, and external projections presented toward each other through which the conduits continue, said compact links being of such a length as to hold two adjacent external projections together close enough to substantially eliminate a gap, thereby establishing a continuous communication through all the conduit links alone.

6. A wire concealing chain comprising a series of conduit links communicating one with another, and alternating therewith a series of intermediate solid links interlocking with the adjacent conduit links so as to jointly support a load and holding the external ends of said conduit links in communicating relation practically without a gap between them.

7. A wire concealing chain comprising conduit links constructed with longitudinal conduits having external end openings, said end openings of the adjacent links communicating to permit a wire to pass in the same vertical plane from one conduit link to the next, substantially in one direction, and compact intermediate links alternating with said conduit links and interlocking with the adjacent conduit links and being of such length as to hold the external end openings of the conduit links in position to establish a continuous communication through the conduit links alone practically without a break.

8. A wire concealing chain comprising a series of conduit links having alined openings through which a wire may pass in the same vertical plane substantially in one direction from one to another, and alternating therewith a series of intermediate links interlocking with adjacent conduit links; the external length of said intermediate links being practically the same as the added thickness of the parts of two adjacent conduit links, which it incloses.

9. A wire concealing chain comprising a series of conduit links having alined openings through which a wire may pass in the same vertical plane substantially in one direction from one to another, and alternating therewith a series of compact intermediate links interlocking with adjacent conduit links; the internal length of said intermediate links being practically the same as the added thickness of the parts of two adjacent conduit links, which it incloses and said intermediate links being divided into a plurality of members constructed with means for interlocking them one to another.

10. A chain comprising two links to be connected and a connecting link passing through and connecting together the first-named links; said connecting link being divided into two members abutting together and constructed with dowel connections at their abutting ends.

11. In a chain, the combination of two links to be connected and a connecting link; said connecting link passing through both the links to be connected and being divided at a point within each link which it connects to provide two separable parts; said separable parts being constructed to abut within the links to be connected and being provided with dowel connections at their points of abutment.

12. A chain comprising two links to be connected lying in one plane, and a connecting link passing through both of the links first-named and lying in a plane at an angle to the plane of said first-named links; said connecting link being divided in the plane of said first-named links, into two parts; the parts of said connecting link being constructed with dowel connections.

13. A chain link comprising a plurality of members constructed with means for interlocking them one to another; each connecting means consisting of a dowel and socket, and means to lock the dowel in the socket.

The foregoing specification signed at Boston, Mass., this 17th day of October, 1912.

WILLIAM H. BLAKE.

In presence of two witnesses:
ALFRED E. TADGELL,
HUGH T. DIMOND.